US006838277B1

(12) United States Patent
Elashvili

(10) Patent No.: US 6,838,277 B1
(45) Date of Patent: Jan. 4, 2005

(54) FURTHERING THE ENZYMATIC DESTRUCTION OF NERVE AGENTS

(75) Inventor: Ilya Elashvili, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 371 days.

(21) Appl. No.: 10/131,946

(22) Filed: Apr. 23, 2002

Related U.S. Application Data

(60) Provisional application No. 60/288,316, filed on May 3, 2001.

(51) Int. Cl.[7] .................................................. B09B 3/00

(52) U.S. Cl. .................................... 435/262.5; 435/822

(58) Field of Search ............................... 435/262.5, 822

(56) References Cited

U.S. PATENT DOCUMENTS 6,599,733 B1 * 7/2003 Fry et al. ................. 435/252.4

* cited by examiner

*Primary Examiner*—David A. Redding
(74) *Attorney, Agent, or Firm*—Ulysses John Biffoni

(57) ABSTRACT

A method of enzymatic degradation of hydrolyzed nerve agents GB, GD, GF, VX and O-isobutyl S-(diethylaminoethyl) methylphosphonothioate into biodegradable methylphosphonate products using enzymes from bacteria that can use for growth as the sole phosphorus source, low concentrations of ethyl-isopropyl-, and pinacolyl methylphosphonates (EMPn, IMPn, and PMPn-alkali treatment products of VX, GB, and GD, respectively).

12 Claims, 15 Drawing Sheets

FURTHERING THE ENZYMATIC DESTRUCTION OF NERVE AGENTS

CROSS-REFERENCE TO RELATED APPLICATIONS

This application is a non-provisional continuation of provisional application Ser. No. 60/288,316, filed on May 3, 2001.

GOVERNMENT INTEREST

The invention described herein may be manufactured, used and licensed by or for the U.S. Government.

BACKGROUND OF THE INVENTION

1. Field of the Invention

This invention relates to the biodegradation capability of neutralized organophosphorus nerve agents. The invention further relates to biodegradation of hydrolyzed nerve agents using enzymes derived from bacteria.

2. Brief Description of Related Art

Neurotoxic chemical warfare (CW) agents, particularly G-type agents: GB, GD, and GF and V-type agents: VX and O-isobutyl S-(2-diethyl-aminoethyl) methylphosphonothioate (Russian-VX or R-VX) are in the stockpiles of the U.S. and former Solviet Union (Chapalamadugu, (1992), *Microbiological and biotechnological aspects of metabolism of carbamates and organophosphates*, (*Crit. Rev. Biotechnol* 12, 357–89, Fedorov (1994) *Chemical Weapons in Russia: History, Ecology, Politics* [*Khimicheskoye Oruzhiye Vrossi: Istoriya, Ekologiya, Politka. Center of Ecological Policy of Russia, Moscow, Russia*, Marrs et al., (1996) *Chemical Warfare Agents: Toxicology and Treatments*, New York, Somani (1992) *Toxicodynamics of nerve agents, In Chemical Warfare Agents*, pp. 67–123, Academic Press, New York). The USA signed the Chemical Weapons Convention Agreement (UN, 1992) in 1993 and ratified it on Apr. 25, 1997 that requires the destruction of all CW agents within ten years of ratification. Current chemical decontaminants contain corrosives, such as for example alkali agents (Yang, (1992), *Decontamination of chemical warfare agents, Chem. Rev.* 92, 1729–1743) and incineration has met with community opposition. The U.S. Army has been pursuing alternative technologies, such as enzymatic decontamination, that are safe and environmentally friendly (DeFrank (1993) *Screening of halophilic bacteria and Alteromonas species for organophosphorus hydrolyzing enzyme activity, Chem. Boil. Interact.* 87, 141–148). Degradation of G- and V-type agents can be accomplished using phosphoric triester hydrolase enzymes, e.g. organophosphorus hydrolase OPH (Dumas, (1989) *Purification and properties of the phosphotriesterase from Pseudomonas diminuta, J. Biol. Chem,* 264, 19659–19665, Dumas (1990) *Inactivation of organophosphorus nerve agents by the phosphotriesterase from Pseudomonas diminuta, Arch. Biochem. Biophys,* 277, 155–159.) and organophosphorus acid anhydrolase OPAA (Cheng, (1993) *Purification and properties of a highly active organophosphorus acid anhydrolase from Alteromonas undina, Appl Environ Micrbiol.,* 59, 3138–3140, DeFrank, (1991) *Purification and properties of an organophosphorus acid anhydrase from a halophilic bacterial isolate, J. Bacteriol* 173, 1938–1943; Elashvili (1999), *Purification and characterization of DFPase from Alteromonas haloplanktis ATCC* 14393*, Proceedings of the* 1998 *U.S. Army Edgewood Research, Development and Engineering Center Scientific Conference on Chemical and Biological Defense Research.*, ECBC-SP-004, pp 763–771), which, similar to alkali remove labile leaving moieties resulting in ionic methylphosphonate ester products. This enzymatic degradation process for the five selected nerve agents GB, GD, GF, VX, and R-VX would result in h-GB (IMPn), h-GD (PMPn), h-GF (CMPn), h-VX (EMPn), and h-R-VX (iBMPn) products, respectively (Scheme 1).

Scheme 1

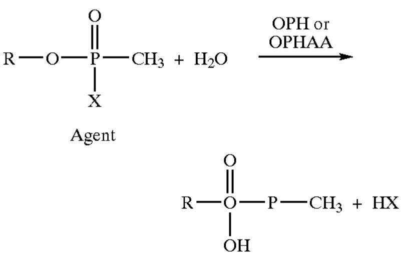

H-Agent

| | | |
|---|---|---|
| GB | X = F | R = i-Propyl |
| GD | X = F | R = Pinacolyl |
| GF | X = F | R = Cyclohexyl |
| VX | X = $S(CH_2)_2N[CH(CH_3)_2]_2$ | R = Ethyl |
| R—VX | X = $S(CH_2)_2(CH_2(CH_3)_2$ | R = i-Butyl |

The neurotoxic chemical warfare agents considered and shown have X as fluorine or other group that is more labile to hydrolysis than the A alkyl group and therefore is designated as the leaving group.

Although the invention is useful for decontaminating nerve agents that are in stock piles, it is also useful in the field for nerve agent decontamination of affected areas.

There is no suitable known method for further degrading h-agents into hydrolyzed agents. The hydrolysis of V- and G-type agents by alkali (e.g. NaOH) or by enzymes (e.g. OPH or OPAA) generates stable Alkyl methylphosphonate products, which could inhibit the activity of the initial agent hydrolase enzyme. For example, diisopropyl phosphate, a product of the diisopropyl fluorophosphate hydrolysis by OPH, was shown to be inhibitory to the OPH activity (Elashvili (1999), *Purification and characterization of DFPase from Alteromonas haloplanktis ATCC* 14393*, Proceedings of the* 1998 *U.S. Army Edgewood Research, Development and Engineering Center Scientific Conference on Chemical and Biological Defense Research*, ECBC-SP-004, pp 763–771). PEH hydrolysis of Alkyl methylphosphonates, which are persistent in the environment, to the biodegradable methylphosphonate product that is easily degraded by environmentally prevalent microbes utilizing it as a phosphorus source, not only results in the enhancement of the effectiveness of the agents degradation, but also leads to their subsequent mineralization by common soil and aquatic bacteria in the environment. Therefore, there is a present need to further degrade these chemicals.

It is an object of the present invention to provide a method of biodegrading nerve agents.

It is another object of the present invention to biodegrade nerve agents with enzymatic agents.

It is still another object of the present invention to further destruction of nerve agents using microorganisms that produce enzymes that degrade hydrolyzed nerve agents.

These and other objects of the present invention will become apparent upon further reading of this disclosure.

SUMMARY OF THE INVENTION

The present invention is related to enzymes that further degrade h-agents. H-agents are hydrolyzed versions of nerve agents, particularly hydrolyzed versions of neurotoxic chemical warfare G-type agents: GB,GD, and GF, and V-type agents: VX and O-isobutyl S(2-diethyl-aminoethyl) methylphosphonothioate (Russian-VX or R-VX).

The inventors have searched to find enzymes that would further degrade these chemicals. The present inventors have found two strains of microorganisms that produce enzymes that facilitate further degradation of these chemicals. These microorganisms advantageously have the ability to grow on methylphosphonate (MPn) and ethyl methylphosphonate (EMPn) as the sole sources of phosphorus. The enzymes that they produce degrade all or most phosphonate esters generated during the nerve agent hydrolysis via esterase cleavage resulting in MPn product for the five selected compounds (Scheme 2).

Scheme 2

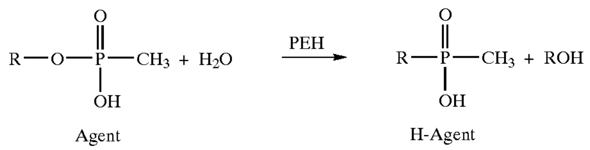

PEH=phosphonate ester hydrolase. The source of PEH is from *B. caryophilli.*

Deposit Information:

Bacterial Cells (PG2982) were deposited on Mar. 5, 2002 with ATCC PO Box 1549 Manassas, Va. 20108 under accession number PTA-4116.

BRIEF DESCRIPTION OF THE FIGURES

FIG. 3 is a series of graphs showing PEH degradation of h-GF and h-GD on a time line. The timeline of the GC-FPD chromatograms of the PEH reactions at 30° C. with the two (h-GF and h-GD) out of the total of five substrates (ca. 10 mM) and their controls are shown FIG. 3G-L illustrates an h-GD timeline of 0 hour (G), ½ hour (B), 1 hour (1), 3 hour (J), 19 hour (K) and control (L), respectively. The partially purified PEH enzyme constituted ~3.2% of the total reaction mixture volume. The Control samples represent 19-hour reaction mixtures that contained the buffer used for the enzyme reconstitution instead of the PEH enzyme. The reaction samples were derivatized prior to GC-FPD chromatography. The retention time ($t_r$) of ca. 4.39 minutes of the derivatized enzymatic reaction products of all the five substrates was similar to that of the derivatized methylphosphonic acid (MPn) standard. The $t_r$ values for derivatized h-GD and h-GF were ca. 6.25 minutes and ca. 8.24 minutes, respectively. (The dotted lines mark the end of the solvent peaks.)

DETAILED DESCRIPTION

Figure 1:
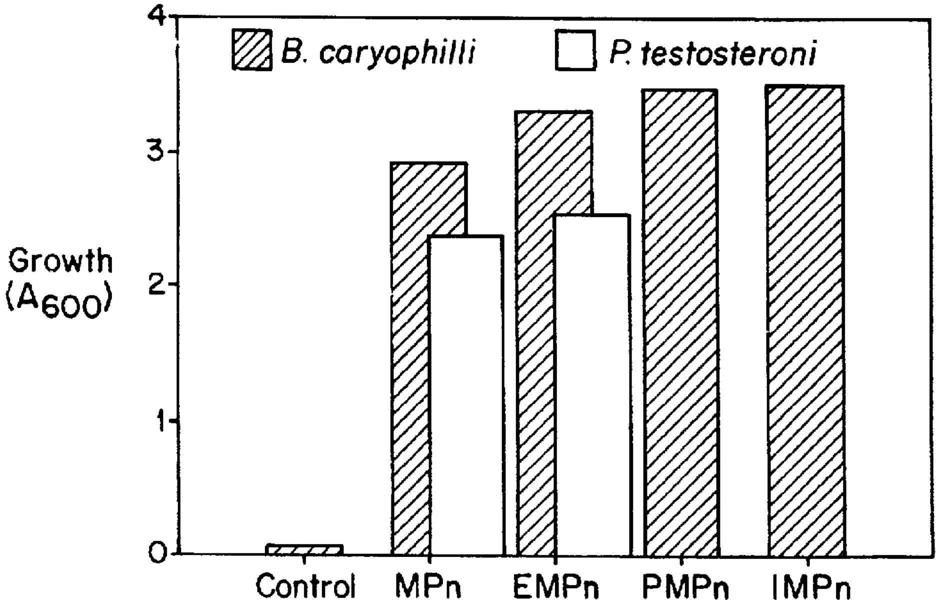
FIG. 1 is a graph showing phosphonate substrate utilization capability of the microorganisms that are the subject of the present invention.

Organism and Growth Conditions:

The two bacterial strains that are the subject of this invention are *Burkholderia caryophilli*(PG2982) and *Pseudomonas testosteroni* and they utilize both MPn and EMPn as the sole sources of phosphorus. The *B. caryophilli* PG2982 strain, because it is capable of utilizing the organophosphorus pesticide, glyphosate, contains phosphonate monoester hydrolase gene. The second strain of *P. testosteroni* was also chosen because it can utilize alkylphosphonates as a sole source of phosphorus.

The two bacterial strains used in this study were provided by Dr. Braymer (*B. caryophilli* PG2982) and Dr. Alexander (*P. testosteroni*). Unless otherwise indicated, the cultures were routinely grown at 30° C. for 40 hours in new MOPs medium (NMM) adapted from the modified MOPS medium (Elashvili, (1997) *Phosphonate transporter mutation enhances the utilization of diisopropylphosphate . . . , Proceedings of the* 1996 *U.S. Army Edgewood Research, Development and Engineering Center Scientific Conference on Chemical and Biological Defense Research*, pp189–195, Elashvili, (1998) *phnE and glpT genes enhance utilization of organophosphates in Escherichia coli K*-12*, Applied and Environmental Microbiology,* 64:2601–2608), incorporated herein by reference, supplemented with 0.3 mM h-GB as the sole phosphorus source. NMM contained (per liter) 8.372 g 3-(N-morpholino) propanesulfonic acid (MOPS), 0.717 g of N-Tris(hydroxymethyl)methyl glycine (Tricine), 2.92 g of NaCl, 0.51 g of $NH_4Cl$, 102 mg of $MgCl_2.6H_2O$, 10 mg of thiamine, 6 mg of $MgSO_4.7H_2O$, 3 mg of nitrilotriacetic acid, 48 mg of $K_2SO_4$, 1 Mg of $MnSO_4.H_2O$, 2.8 mg of $FeSO_4.7H_2O$, 0.1 mg of $CoCl_2$. $6H_2O$, 0.1 mg of $ZnSO_4.7H_2O$, 0.02 mg of $H_3BO_3$, 0.01 mg of $Na_2MoO_4.2H_2O$, 0.01 mg of CuSO4, and 1 g of glucose, 1 g potassium D-glucose, 1 g sodium citrate, and the pH was adjusted to 7.0 with KOH prior to sterilization through 0.2 μg filter.

To ascertain PEH activities (enzymatic hydrolysis of phosphonate esters) of different bacterial crude extracts, a one-liter Erlenmeyer flask with 300 ml media inoculated with *B. caryophilli* was routinely incubated at 30° C. for 40 hours on a recirculatory shaker at 200 rpm For the enzyme purification, *B. caryophilli* was cultured in four 6 liter flasks at 150 rpm in a total of 10 liters of the medium. The cells were collected by centrifugation at 7,000×g for 30 minutes at room temperature, gently resuspended in a minimum amount of 100 mM Tris buffer, pH 8.0, 100 mM KCl and spun again at 24,000×g for 20 minutes at 4° C. The supernatant was aspirated and the pellet was stored below −85° C. Unless otherwise indicated, subsequent procedures for the enzyme extraction and purification were conducted below 4° C. and enzyme fractions were stored below −85° C.

Preparation of Hydrolyzed Agent Substrates:

GB, GD, GF, VX, and Russian-VX chemical agents (0.1–0.3 M, CASEARM grade) were hydrolyzed in 1N NaOH for 2 days and subsequently titrated with HCl to neutral pH. Molar equivalent amount of NaOH is required, however 3–10 times the amount of NaOH can be used. Room temperature is adequate. We compared the resulting hydrolyzed agents, h-GB, h-GD, and h-VX with the corresponding commercially obtained compounds isopropyl methylphosphonate (IMPn), pinacolyl methylphosphonate (PMPn), and Ethyl methylphosphonate (EMPn) of the highest available purity. The purity of our hydrolyzed agent preparations was compatible with commercially available corresponding compounds as judged by the analysis of their derivatives on GC-FPD.

The total agent hydrolysis to methylphosphonate (i.e. nerve agent alkyl methylphosphonate methylphosphonate) in the field can be performed using PEH enzyme in formulation (mixture) together with the agent degrading enzymes (e.g. OPH, OPAA). The agent hydrolysis in large scale can be performed similarly or by use of excess alkali (nerve agent alkyl methylphosphonate), followed by neutralization (i.e. pH titration) prior to applying PEH enzymatic treatment (alkyl methylphosphonate methylphosphonate).

Figure 3A:
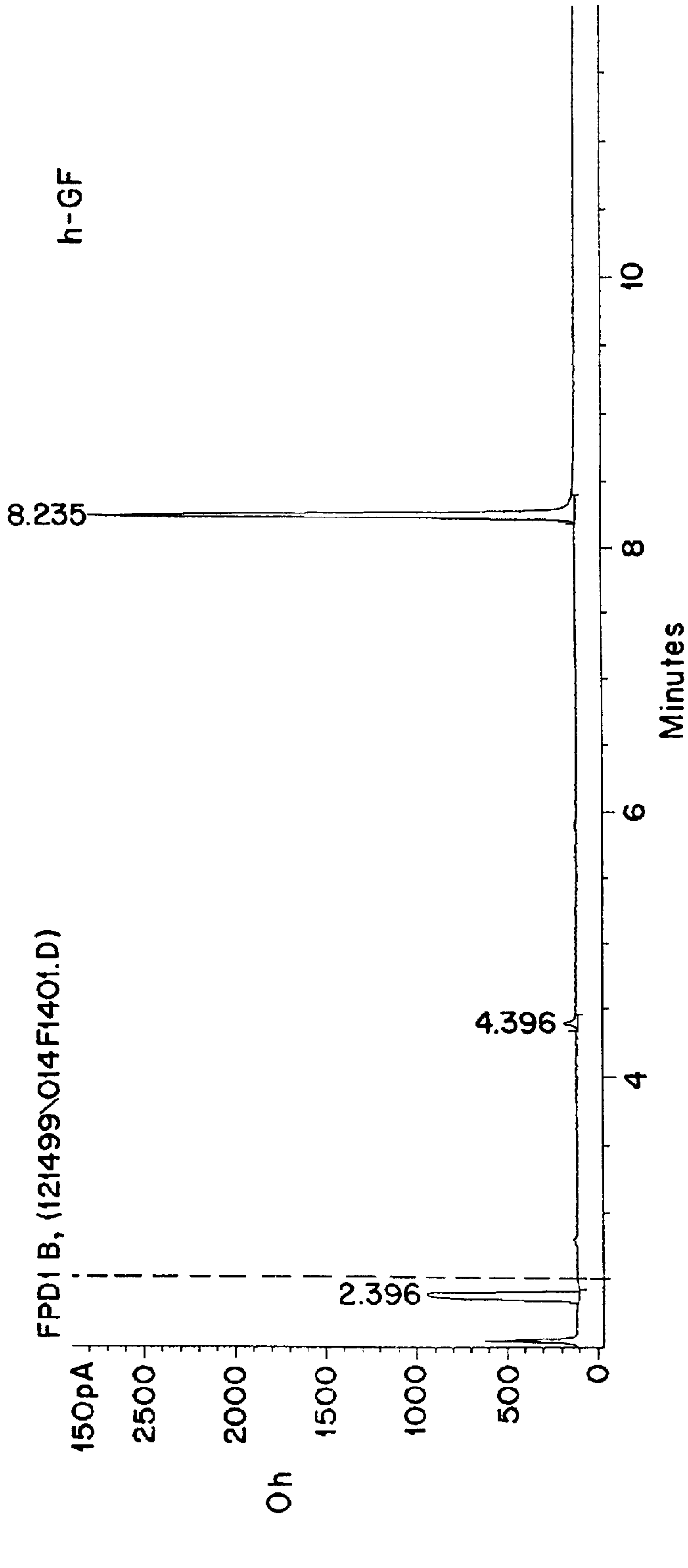
FIG. 3A-F illustrates an h-GF timeline of 0 hour (A), 12 hour (1), 1 hour (C), 3 hour (D), 19 hour (E) and control (F), respectively. Similarly.
Figure 3B:
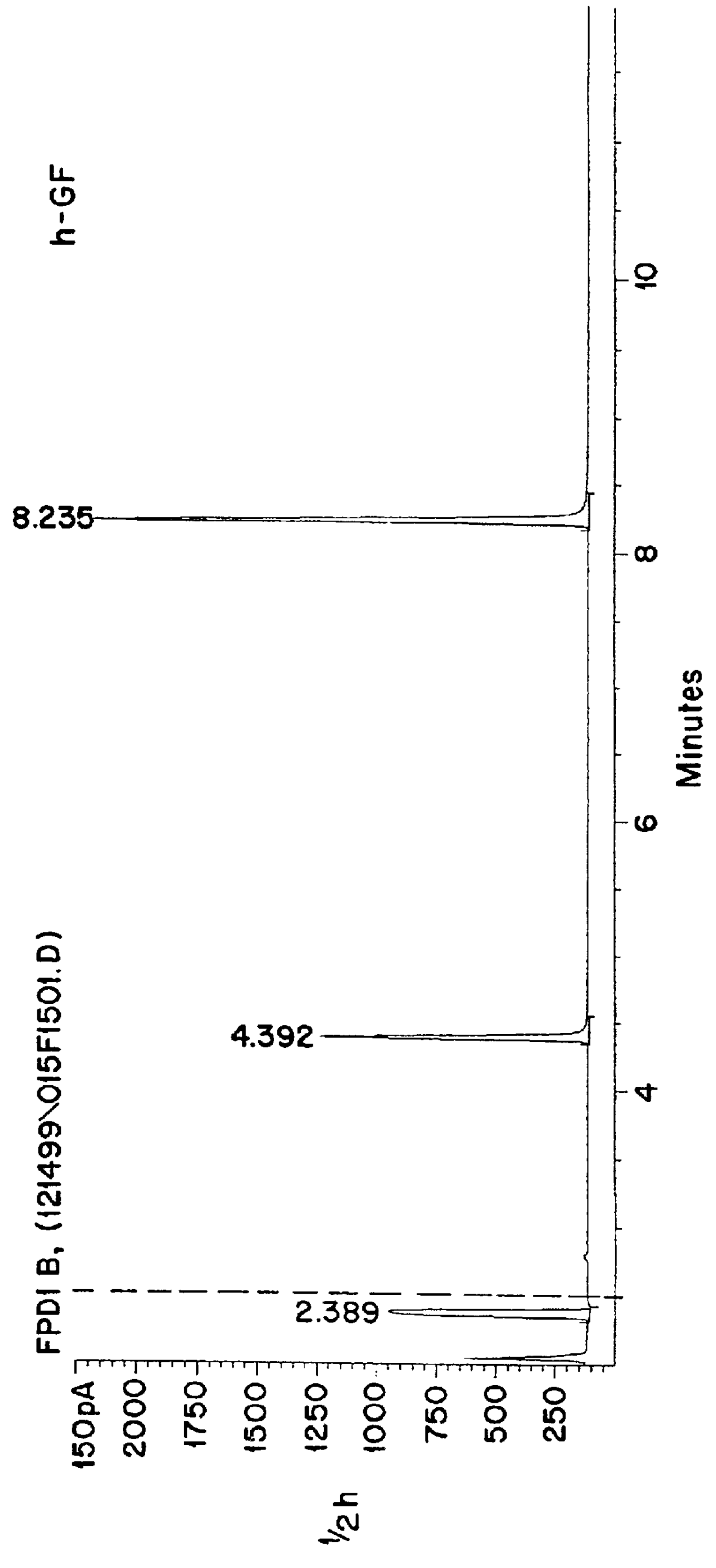
Figure 3C:
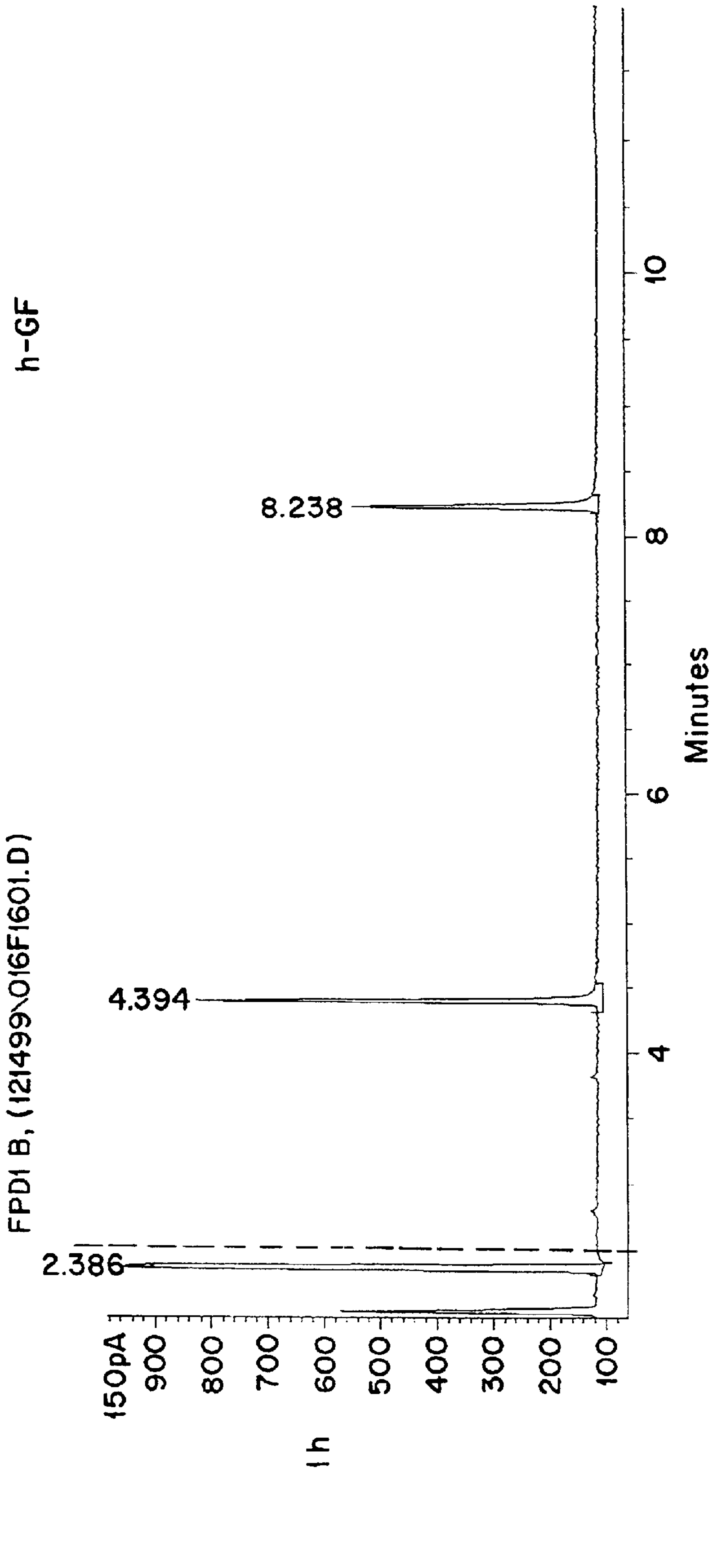
Figure 3D:
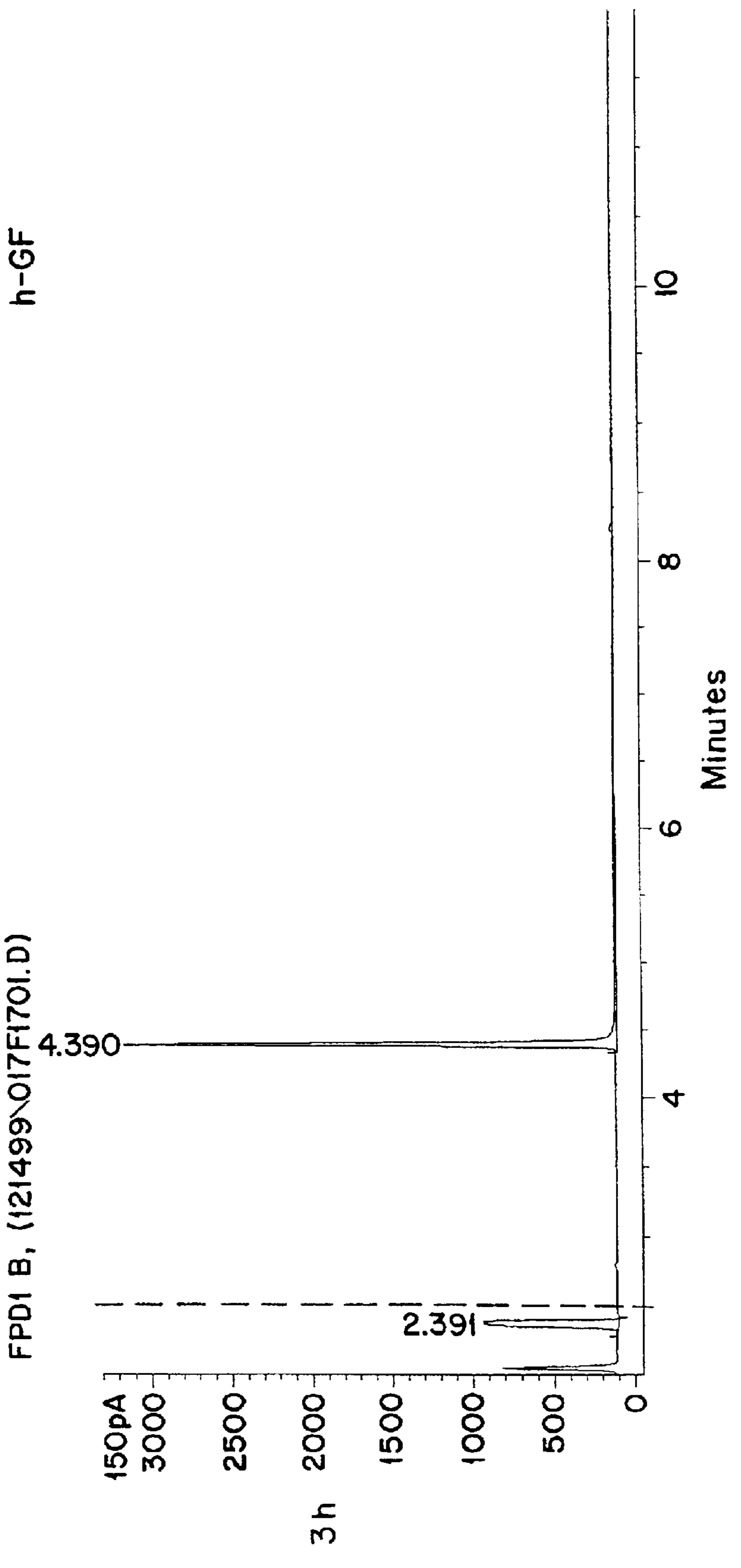
Figure 3E:
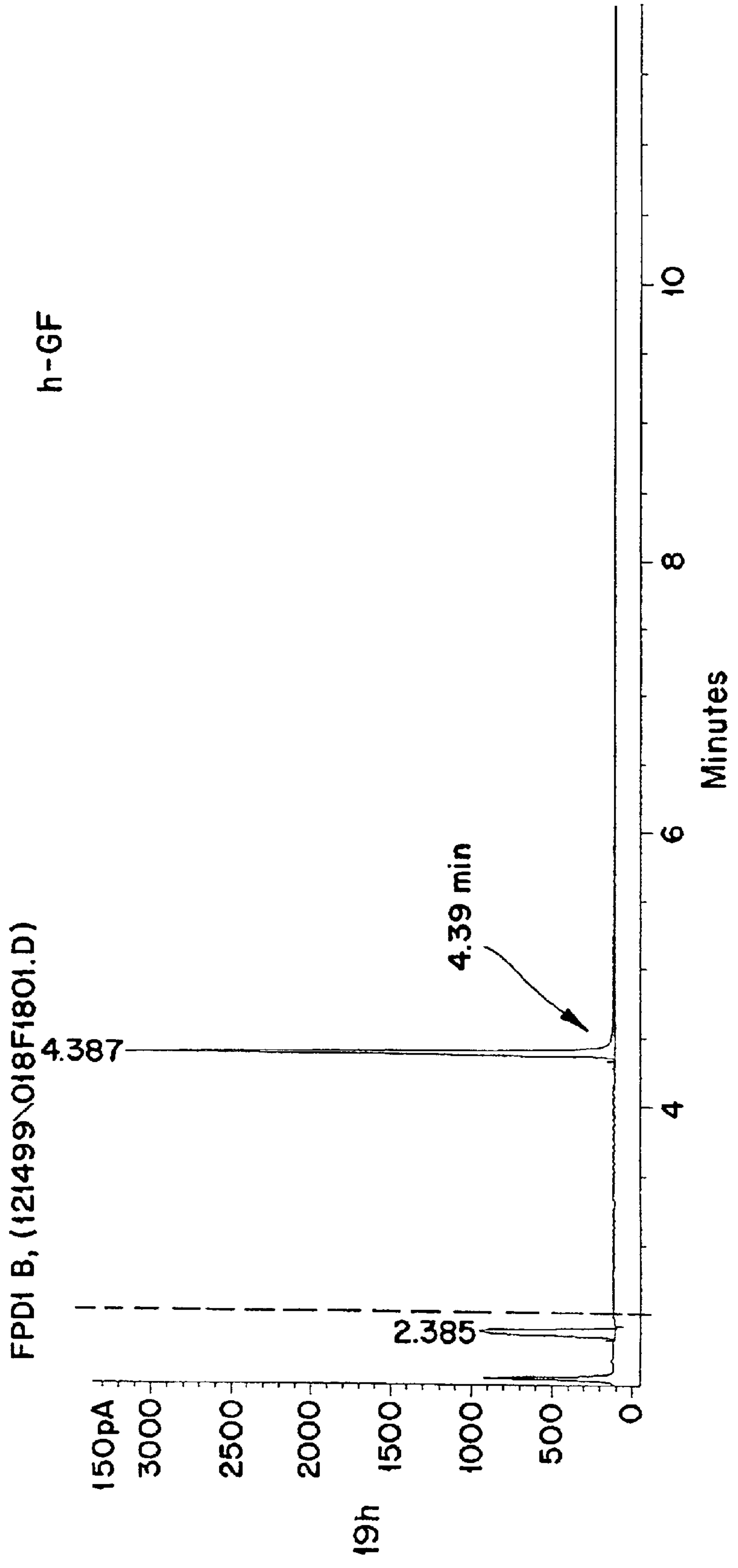
Figure 3F:
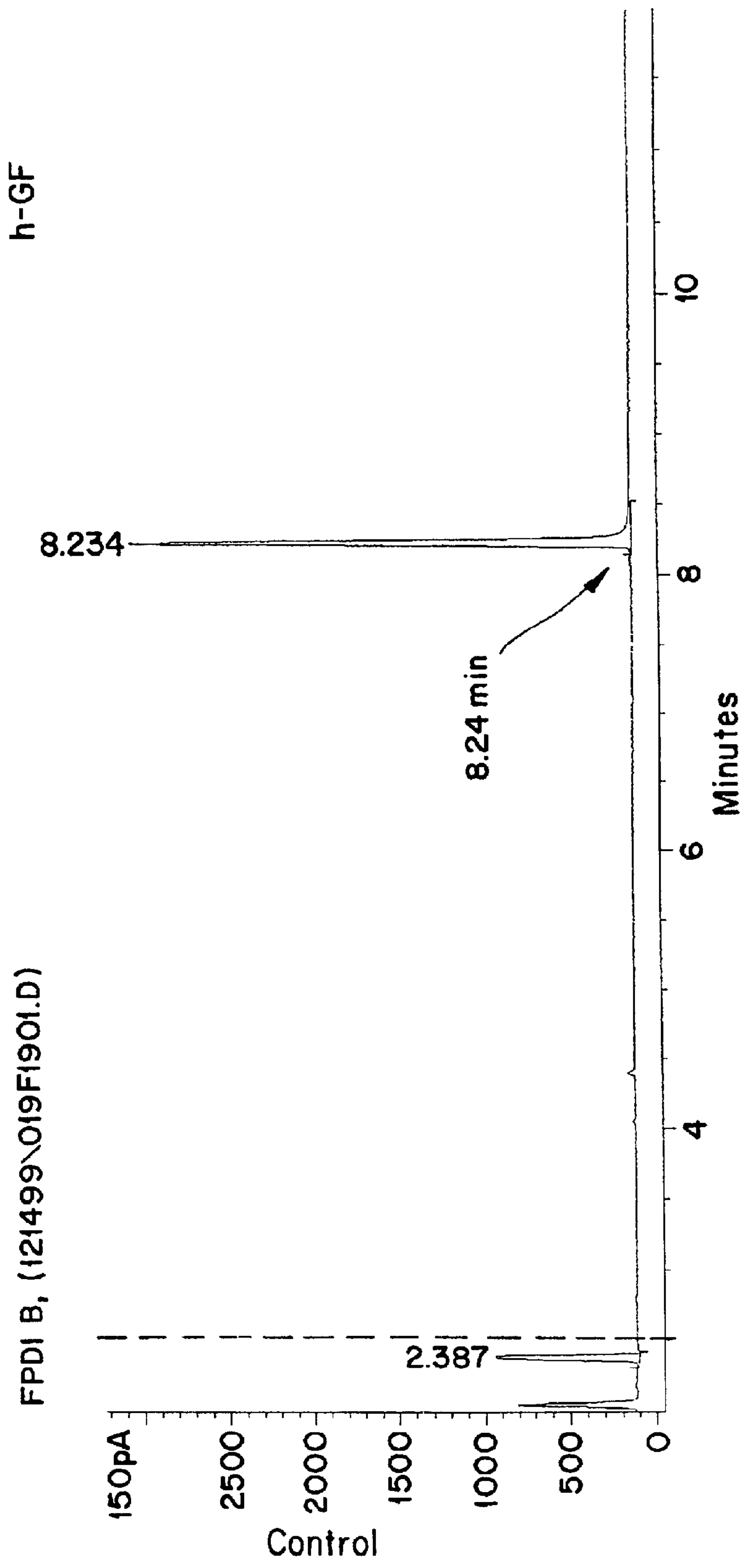
Figure 3G:
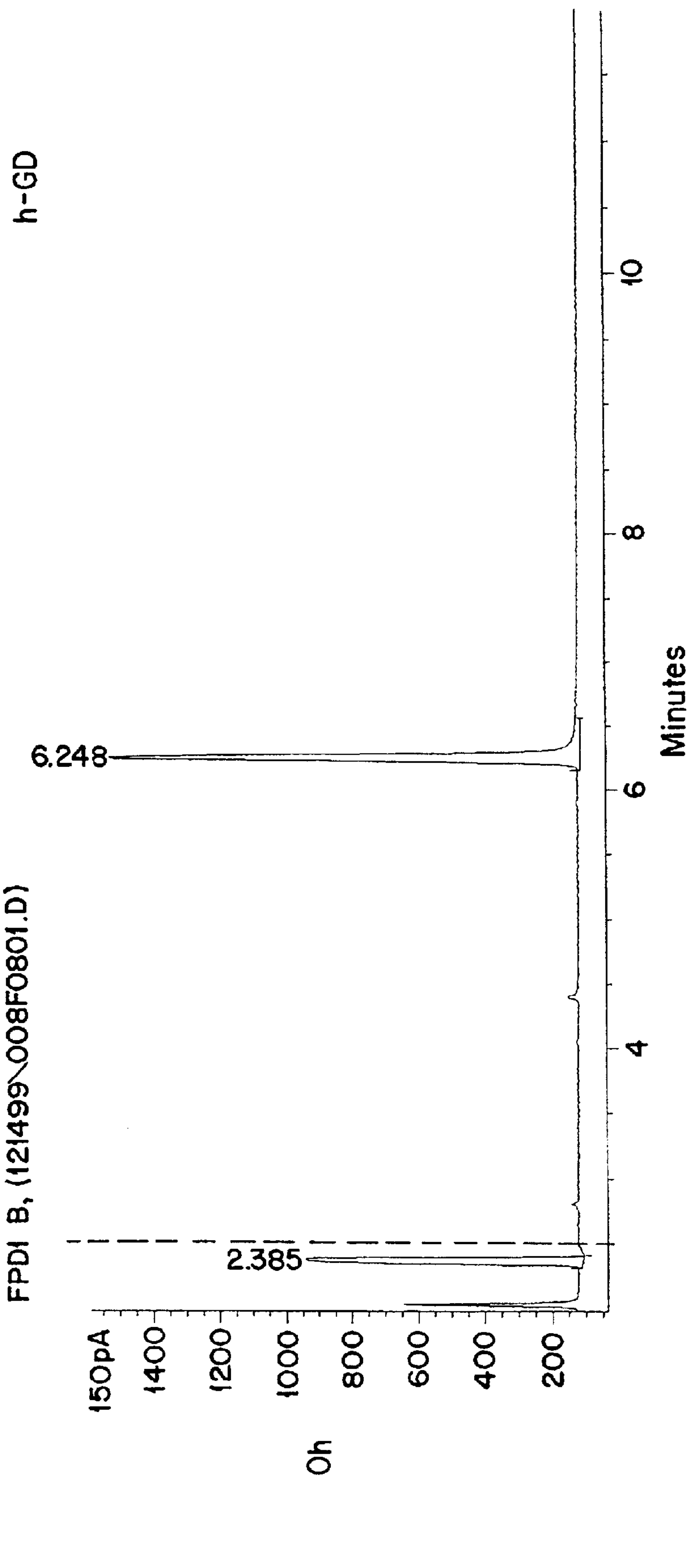
Figure 3H:
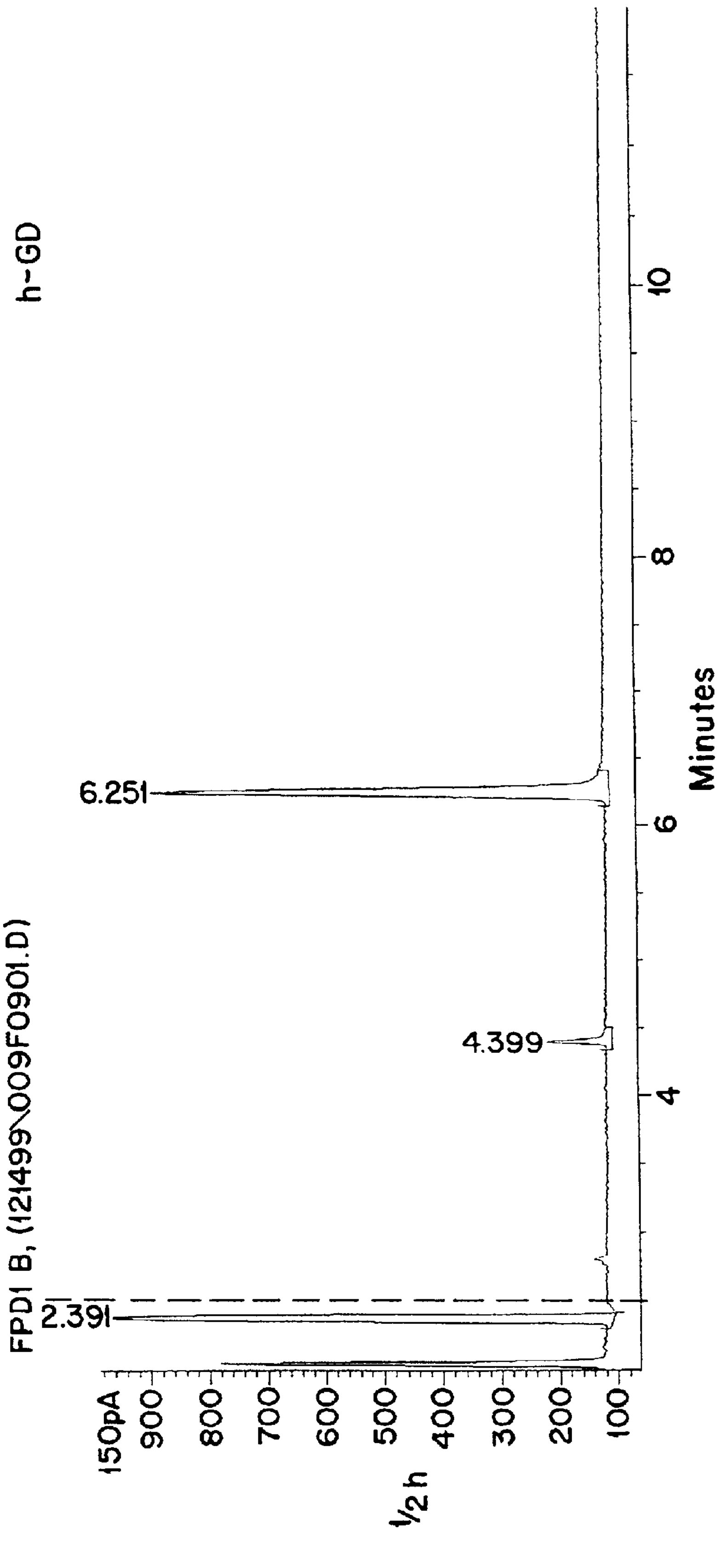
Figure 3J:
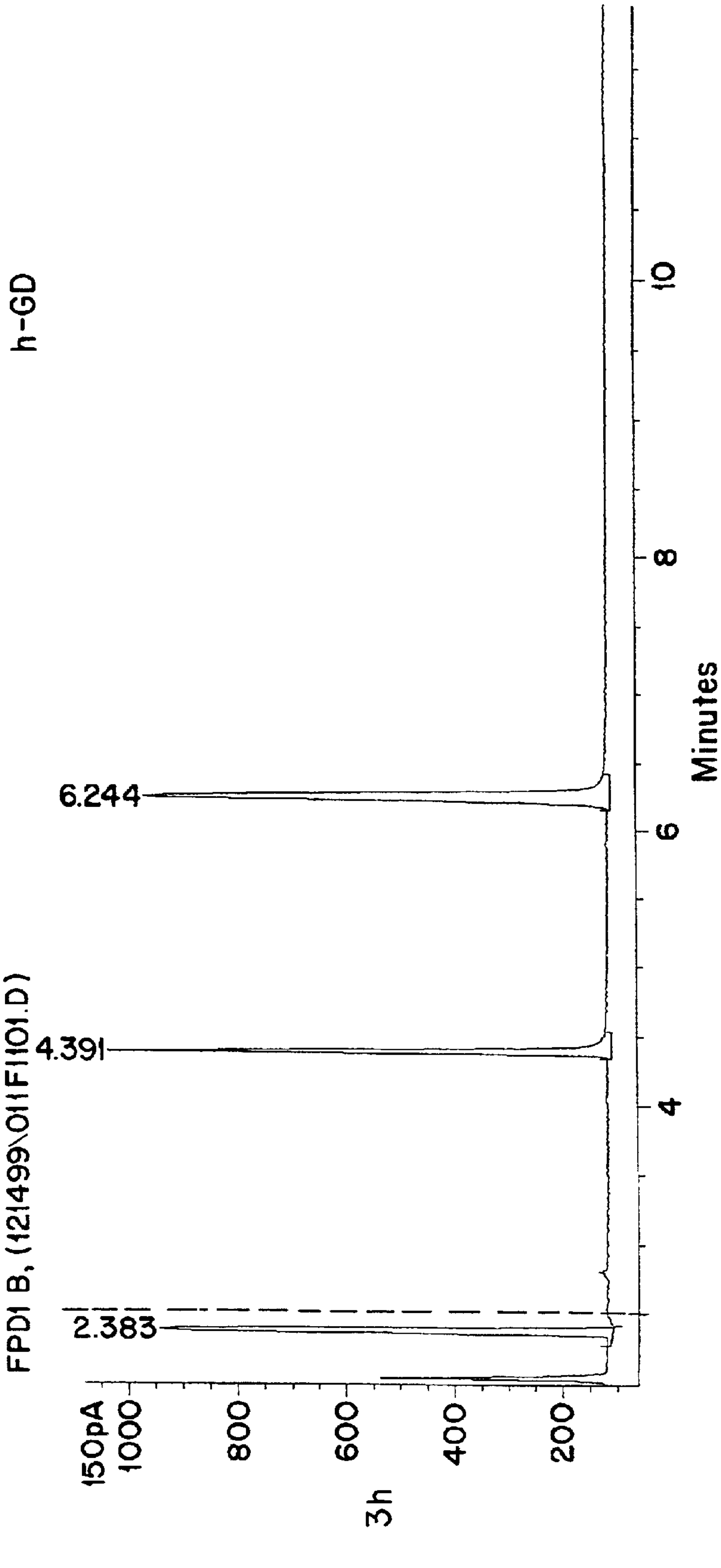
Figure 3K:
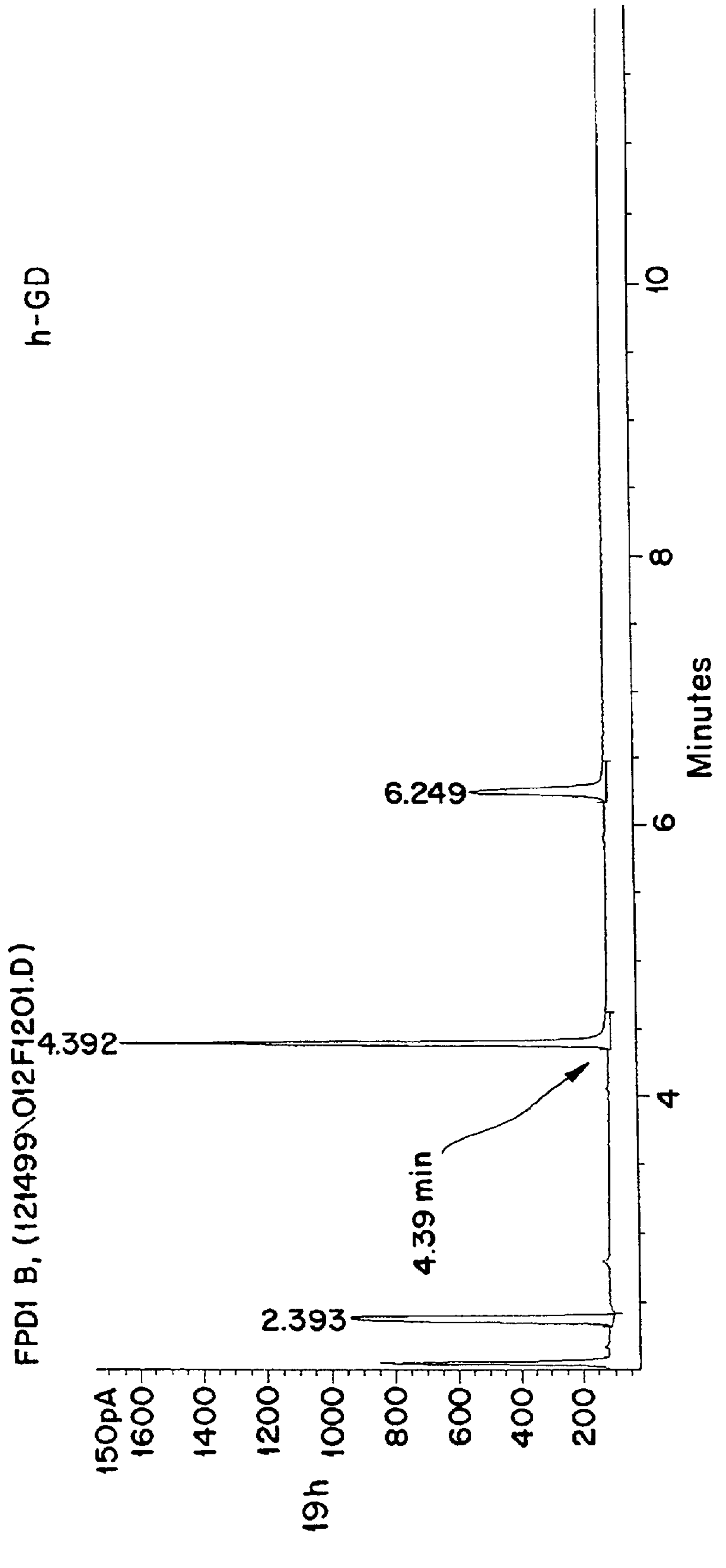
Figure 3L:
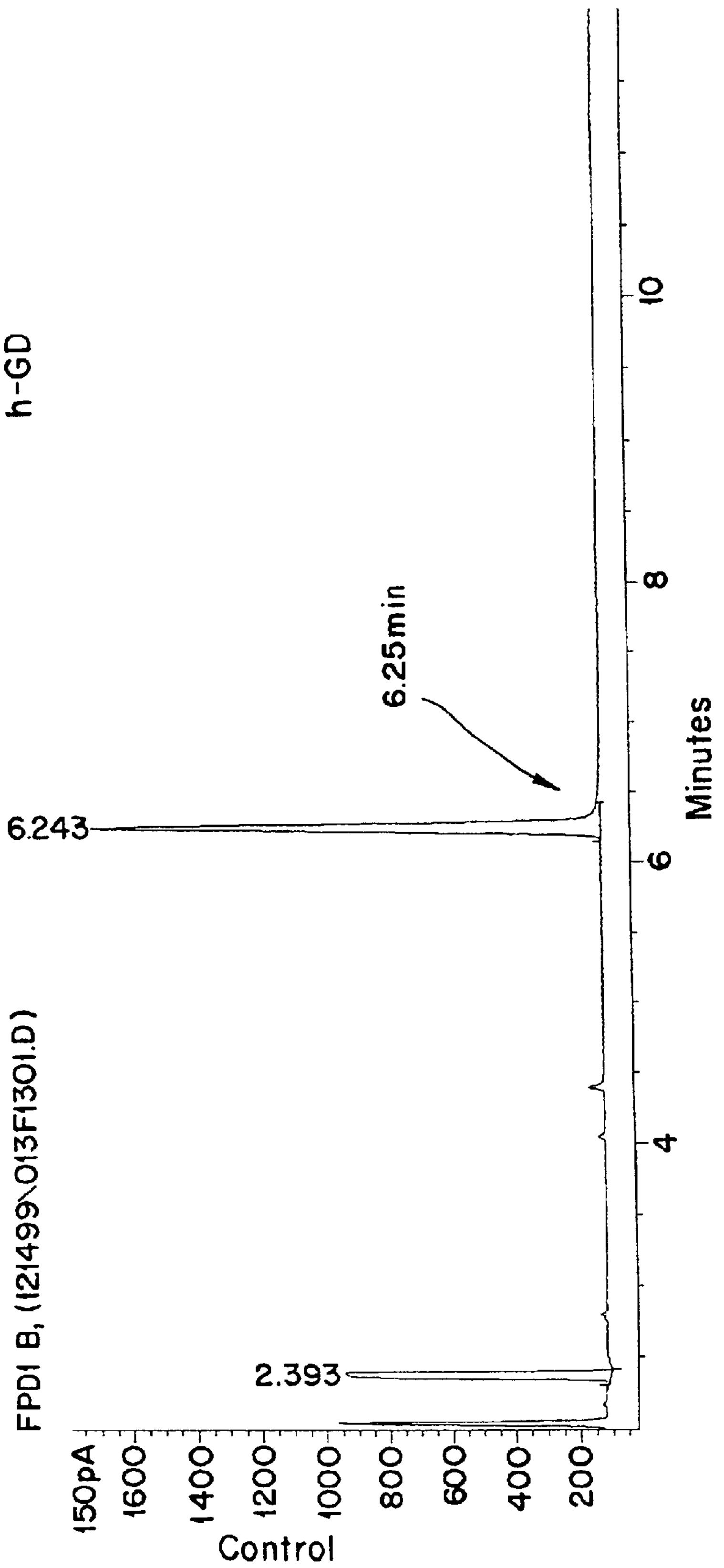
Figure 4:
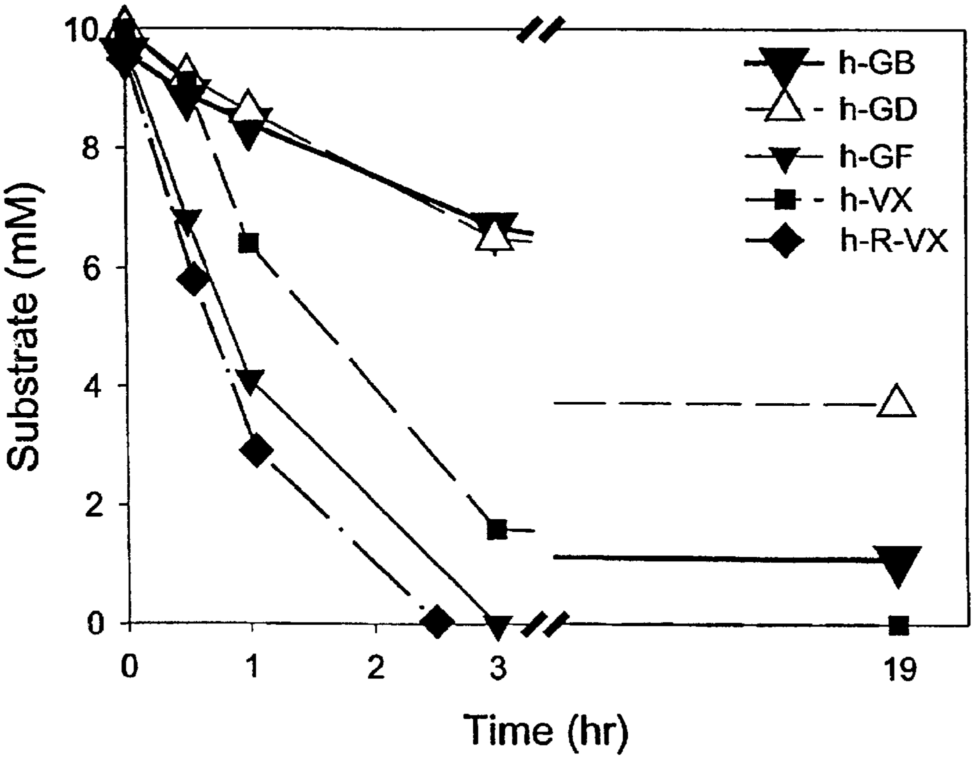
FIG. 4 is a graph showing PEH degradation of hydrolyzed agents.

Enzyme Assays:

Enzyme assays using the enzymes from the microorganisms were conducted at 30° C. with 10 M substrate (substrate=h-compounds from the dydrolization) in 50 mM 1,3-bis-(tris-[hydroxymethyl]-methylamino)-propane (BTP) buffer, pH=8.5, 1 mM $MnCl_2$, and 2 $\mu$l of enzyme sample in a total volume of 60 $\mu$l. At appropriate time intervals (as indicated in FIG. 3 and FIG. 4, i.e. 0, 0.5, 1, 3 and 19 hours) of the reaction, aliquots were withdrawn and added to concentrated sodium hydroxide solution to stop the reaction to make the final NaOH concentration of 1N. Samples were dried, silylated with a mixture of BSTFA+1% TMCS (Pierce) (BSTFA=N,O-bis[trimethylsilyl]trifluoroacetamide and TMCS=trimethylchlorosilane) at ca. 110° C. for 15 min, diluted with $CH_2Cl_2$, and analyzed on GC-FPD. The concentrations of the substrates ($S_R$) in aliquots of the reaction was determined by the formula I below, where $S_I$ is the initial substrate concentration of the reaction, whereas $A_s$ and $A_p$ denote the GC-FPD chromatograms peak areas of the silylated derivatives of the substrate and product of the aliquot, respectively.

$$S_R = \frac{A_s \cdot S_I}{A_s + A_P} \qquad \text{Formula I}$$

The formula is based on the assumption that the ratio of the substrate and product chromatograms' peak area values represent the ratio of their concentrations in the reaction sample. Therefore, the substrate concentration ($S_R$) in the reaction sample is calculated as the fractional value of the substrate peak area over the combined peak areas of the substrate and the product that is subsequently normalized by the initial concentration of the substrate.

To ascertain enzyme activities in chromatographic effluent samples, 2 mM chromogenic p-nitrophenyl phenylphosphonate substrate was used and the room temperature reaction (23° C.) was monitored on a spectrophotometer by measuring the absorbance of liberated p-nitrophenol at 405 nm.

Enzyme Extraction:

All subsequent enzyme extractions and purifications were conducted at 4° C. Frozen pellets of collected cells were resuspended in 100 mM Tris buffer, pH 8.0, 100 mM KCl, 2 mM dithiothreitol (DTT) (3 ml per gram of wet weight). The cells were disrupted by passage through a pre-chilled French Pressure cell (SLM-Aminco) three times at 16,000 psi. Crude cell extracts were obtained after the removal of cellular debris by centrifugation at 37,000×g for 30 min at 4° C. In order to destroy heat labile enzymatic activities in a sample of supernatant, a small portion of the supernatant was boiled for five minutes and precipitates were removed by centrifugation at 13,000×g for 10 minutes.

Figure 2:
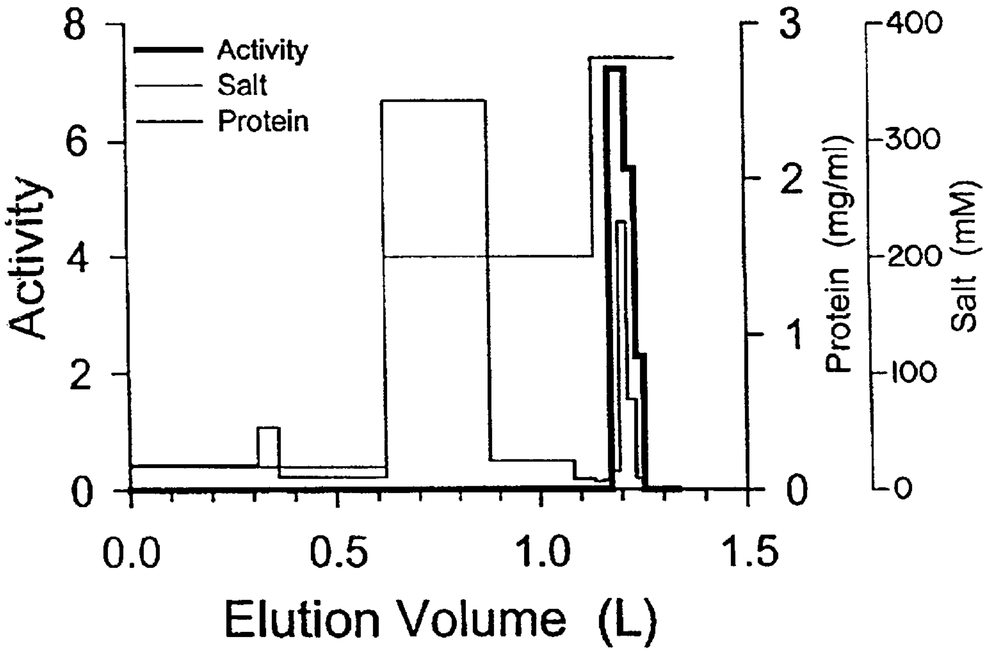
FIG. 2 is a graph showing PEH purification on DEAE-Sepharose FF.
Figure 31:
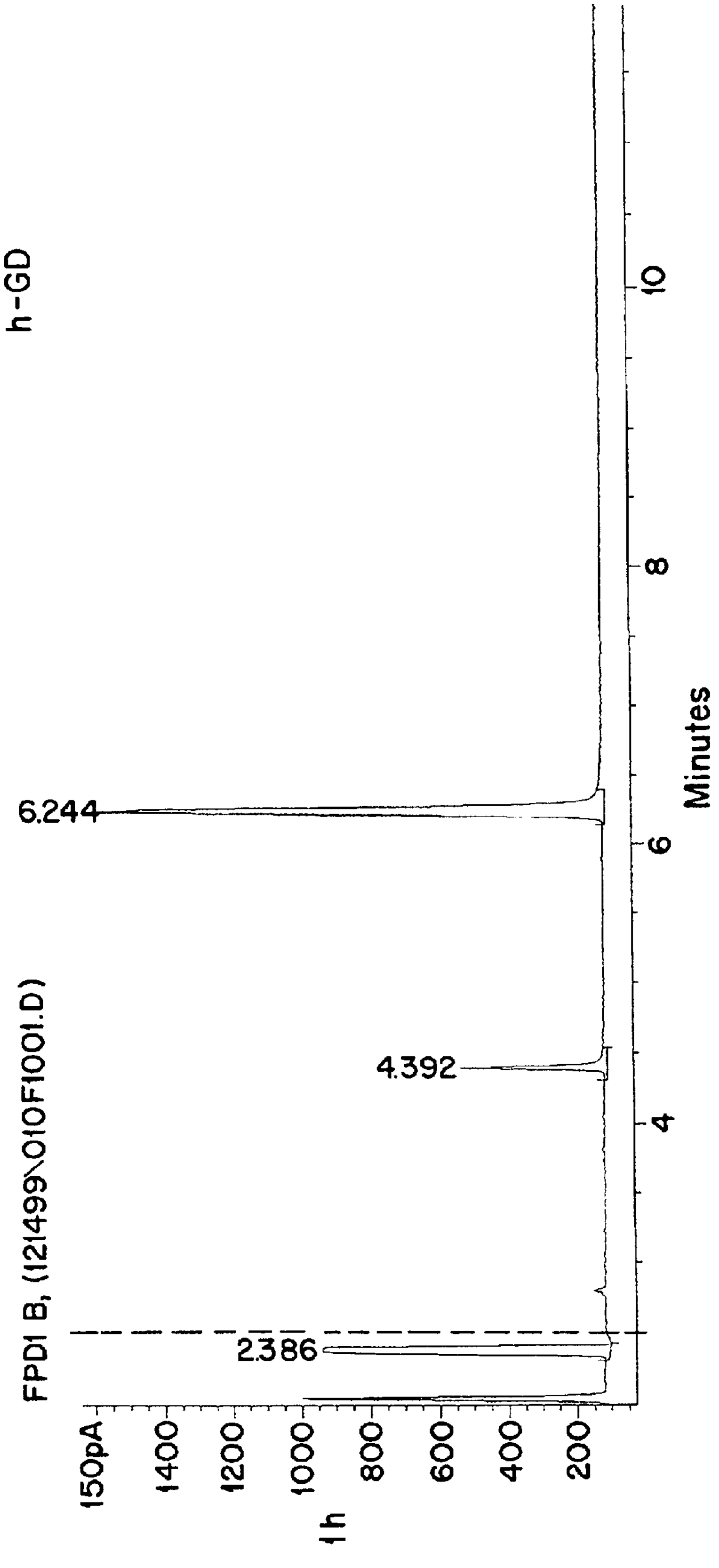

Enzyme Purification on Ion-Exchange Column:

To remove nucleic acids from the crude extract preparation, ten-percent suspension of a cationic polymer Biocryl BPA-1000 (Supelco, Bellefonte, Pa.) was added to the crude extract to make the final polymer concentration of one percent. After mixing, the extract was incubated on ice for 10 minutes and centrifuged at 37,000×g for 30 minutes. This treatment did not affect the enzyme activity, but it was very effective for nucleic acid removal as judged by the UV (between 200–300 nm) spectral comparisons of pre- and post-treatment samples (data not shown). The supernatant was diluted with 3-fold volume of 4° C. chilled 2 mM DTT solution and the sample mix was chromatographed on a DEAE-Sepharose Fast Flow (Amersham/Pharmacia Biotech Inc., Piscataway, N.J.) anion-exchange column (25×150 mm). Before the sample application, the column was washed with two column volumes of the 2 M KCl solution and equilibrated with five column volumes of the 20 mM Tris buffer, pH 8.0. After the sample loading, the column was washed with 3.5 column volumes of the 20 mM Tris buffer, pH 8.0, 2 mM DTT, followed by 7 column volumes of the 100 mM Tris buffer, pH 8.16, 100 mM KCL, 2 mM DTT to elute loosely bound proteins. The enzyme was eluted with the 100 mM Tris buffer, pH 8.0, 270 mM KCl, 2 mM DT and collected in 20-ml aliquots (FIG. 2). Active fractions (60 ml) were pooled and precipitated with increasing concentrations of ammonium sulfate. Most of the PEH enzymatic activity was recovered in the ammonium sulfate cut between 50–80% (sat.). The resultant pellet was resuspended in the minimal amount of 100 mM Tris buffer, pH 8.0, 100 mM KCl, 2 mM DTT and stored frozen below −85° C. The reason for removing nucleic acids is that high concentrations of nucleic acids hinder the next step of purification because it clogs the DEAE-Sepharose fast Flow anion-exchange column.

Protein Determination:

For protein determination, a protein dye binding method (Bradford, (1976), *A rapid sensitive method for quantitation of microgram quantifies of protein utilizing the principle of protein dye binding Anal. Biochem.* 72, 248–254.), incorporated herein by reference, was used, with bovine serum albumin as the standard.

RESULTS

Selection of an Organism for PEH Enzyme Purification:

The *B. caryophilli* PG2982 strain has been known to be capable of utilizing the organophosphorus pesticide, glyphosate, as the sole phosphorus source and reportedly contains phosphonate monoester hydrolase gene (Dotson, 1996; Moore, 1983; Shinabarger, 1984). Similarly, our tests confirmed that, the *B. caryophilli* PG2982 strain was capable of utilizing the organophosphorus pesticide, glyphosate, as the sole phosphorus source (data not shown). The *P. testosteroni* strain has been reported to utilize alkylphosphonates as the sole phosphorus sources (Cook, 1978a, 1978b).

We tested the growth of *B. caryophilli* PG2982 and *P. testosteroni* strains on 0.3 miff MPn, EMPn, PMPn, and IMPn as the sole sources of phosphorus (FIG. 1). *B. caryophilli* PG2982 and *P. testosteroni*, were pregrown on MPn as the sole phosphorus source, washed three times with P-deficient NMM broth and used as inoculums at the seeding $A_{600}$=0.010 in NMM broth with 0.3 mM phosphonates as the sole phosphorus source and 2% glucose as the carbon source. After 94 hours growth at 28° C. total cell growth was determined turbidimetrically.

The *P. testosteroni* strain grew only on MPn and EMPn, whereas *B. caryophilli* PG2982 grew on all four phosphonates (FIG. 1). No remaining phosphonate substrates were detected in the growth media of the successful growing cultures after the 40-hour incubation period. However, these media contained newly formed inorganic phosphate. It should be noted that both growth of *B. caryophilli* PG2982 and *P. testosteroni* strains grew on all four phosphonate substrates at 1 mM as the sole sources of phosphorus. However, *P. testosteroni* failed to grow on 0.3 mM concentrations of PMPn and IMPn, while showing robust growth when the phosphorus source was 0.3 mM inorganic phosphate. *B. caryophilli* PG2982 was found to be capable of growth on all the phosphonate ester substrates tested and is the preferred organisms.

PEH Enzyme Purification and Characterization:

The cell-free crude extracts obtained from the *B. caryophilli* PG2982 strain, as well as the boiled sample derived from it were tested for the PEH enzymatic activity. The native extract was capable of transforming hydrolyzed nerve agents GB, GD, GF, VX and Russian VX to methylphosphonic acid as judged by the analysis of their silylated derivatives on GC-FPD, whereas the boiled extract had no activity.

A larger scale *B. caryophilli* extract was obtained for purification. After removing nucleic acids and other negatively charged molecules with the cationic polymer, BPA-1000, the enzyme was purified on DEAE-Sepharose Fast Flow columns using KCl step elution. The activity was eluted between 60 ml and 120 ml after the start of 270 mM KCl step (FIG. 2). The active fractions were pooled and concentrated with 50–80% (sat) ammonium sulfate cut.

The partially purified PEH was used to test the enzyme specificity against the selected hydrolyzed agent substrates. The timeline chromatograms of the PEH degradation of two of the substrates, h-GF and h-GD, are shown on FIG. 3. As can be seen on the chromatograms on FIGS. 3A–3G, the peak denoting the h-GF substrate (the silylated derivative's $R_f$ value ca. 8.24 minutes) decreases with the increase of the enzymatic reaction time, until it finally disappears (after 3 hours), while concomitantly the peak denoting the MPn product (the silylated derivative's $R_f$ value ca. 4.39 minutes) increases. Similarly, on FIGS. 3H–3K, the h-GD substrate (the silylated derivative's $R_f$ value ca. 6.25 minutes) degradation to MPn can be observed, although at a slower rate. In contrast, no observable degradation MPn product is visible on the Control chromatogram panels of either of the two substrates as shown in FIG. 3L. The temperature for performing biodegradation is 20–45° with the preferred range being 30–35° C. The pH should be 6.5–9.5 with a preferred range of 8.0–9.5 and most preferred range of 8.5–9.0.

In FIGS. 3A–L and FIG. 4, the enzyme concentrations used were deliberately chosen to be low in order to be able to observe the degradation kinetics comfortably. In FIGS. 3, the 50–80% ammonium sulfate cut of the step gradient purified PEH enzyme constituted 3.2% of the total reaction mixture volume. This enzyme prep is a partially purified enzyme solution, which contains unknown quantities of other proteins besides PHE. This enzyme solution has an approximate total protein content of 33 mg per ml. Since this solution is added to the reaction mixture at 3.2% of the total reaction mixture volume, the total protein in the reaction mixture is ~1 mg per ml. Since this is only a partially purified prep it contains unknown quantities of extraneous proteins and therefore, PEH used in this experiment is much less than 1 mg per ml. PEH concentration can be increased if faster degradation is desired to meet the operational requirements.

In FIGS. 3A–L, the timeline of the GC-FPD chromatograms of the PEH reactions at 30° C. with the two (h-GF and h-GD) out of the total of five substrates (ca. 10 mM) and their controls are shown. The 50–80% ammonium sulfate cut of the step gradient purified PEH enzyme constituted ~3.2% of the total reaction mixture volume. The Control samples represent 19 hour reaction mixtures that contained the buffer used for the enzyme reconstitution instead of the PEH enzyme. The reaction samples were derivatized prior to GC-FPD chromatography. The $R_f$ value of ca. 4.39 minutes of the derivatized enzymatic reaction products of all the five substrates was similar to that of the derivatized MPn standard. The $R_f$ values for derivatized h-GD and h-GF were ca. 6.25 minutes and ca. 8.24 minutes, respectively. (The dotted lines mark the end of the solvent peaks.)

The kinetics of the PEH enzymatic degradation of the five selected hydrolyzed nerve agents are shown on FIG. 4. In this study the decline of the initial 10 mM h-GB, h-GD, h-GF, h-VX, and h-R-VX substrates are plotted as they are degraded by the PEH enzyme. It demonstrates that the enzyme is most effective against h-R-VX, closely followed by h-GF, both of which were completely degraded within the first three hours of the reaction. Only h-GD and h-GB were not completely degraded after 19 hours of the reaction, the former being the least reactive having 37 percent of the initial substrate, while the latter had only 11 percent, had been hydrolyzed just over 60 percent, whereas the latter remained only 11 percent of the original substrate. No detectable degradation product was observed for any of the substrates after 19 hours of incubation in controls without the PEH enzyme. In FIG. 4, the five substrates: h-GB, h-GD, h-GP, h-VX, and h-R-VX were incubated at 30° C. with and without PEH enzyme as in FIG. 3. The remaining substrate concentrations were ascertained as outlined in MATERIALS AND METHODS No detectable degradation product was observed for any of the five substrates after 19 hours of incubation in controls without the PEH enzyme.

These experiments demonstrate the effective degradation of the hydrolyzed nerve agents by the PEH enzyme were incubated at 30° C. with and without PEH enzyme. The order of the PEH activity at 10 mM substrate concentration and BTP buffer, pH 8.5 was as follows h-R-VX>h-GF>h-VX>h-GB>h-GD (i.e., iBMPn>CMPn>EMPn>IMPn>PMPn)

EXAMPLES

Example 1

PEH prep was derived as follows: the purification of the enzyme is conducted as described in the RESULTS section subtitled "PEH enzyme purification and characterization," except 30–80% (sat.) ammonium sulfate cut is made instead of 50–80% (sat.) described in the section. Resultant pellet is dissolved in 50 mM Tris buffer, pH 8.0, 100 mM KCl, 2 mM DTT to the final volume of 1/100 of the volume of the IEC active fractions pooled. If desired the prep can be dialyzed in 50 mM ammonium carbonate buffer to remove DTT and non-volatile salts prior to use. Alternatively, the ammonium sulfate pellet can be dissolved in 50 mM ammonium carbonate buffer.

1. In the case where the agent has to be decontaminated, the PEH prep is added at 1/10 volume of the total final reaction volume to OPAA (and/or OPH) enzyme preparations. The reaction parameters are the same as designated by the relevant patents of OPAA (and/or OPH) enzyme preparations applications.
2. In the case of treating hydrolyzed nerve agents, the PEH prep is added at 1/10 volume of the total final reaction volume to 50 mM ammonium carbonate buffer. This mixture is used to degrade hydrolyzed nerve agents to methylphosphonate. The reaction is conducted between 20–45° C., preferred temperatures 30–35° C.

These and other examples of the concept of the invention illustrated above are intended by way of example and the actual scope of the invention is to be determined solely from the following claims.

What is claimed is:

1. A method of biodegradation of ionic methylphosphonate esters of hydrolyzed GB, GD, GF, VX, Russian VX and/or R-VX comprising the steps of:

(a) treating said ionic methylphosphonate esters with enzymes derived from bacteria comprising *Burkholderis caryophili* PG2982, wherein said bacteria utilize methylphosphonate (MPn), ethyl methylphosphonate (EMPn), isopropyl methylphosphonate (MPn), and/or pinacolyl methylphosphonate (MPn) as sole sources of phosphorus; and (b) degrading said ionic methylphosphonate esters with said enzymes.

2. The method of claim 1, wherein said ionic methylphosphonate esters are degraded with said enzymes into biodegradable methylphosphonate products.

3. The method of claim 1, wherein said ionic methylphosphonate esters are generated by removing labile leaving groups.

4. The method of claim 1, wherein said enzymes are phosphonate ester hydrolase enzymes.

5. The method of claim 1, wherein said degradation takes place at a temperature range of 20–45° C.

6. The method of claim 5, wherein said degradation takes place at a temperature range of 30–35° C.

7. The method of claim 1, wherein said degradation takes place at a pH range of 6.5–9.5.

8. The method of claim 7, wherein said degradation takes place at a pH range of 8.5–9.0.

9. The method of claim 1, wherein said treating comprises treating said ionic methylphosphonate esters directly with enzyme extracted from said bacteria.

10. The method of claim 1, wherein said enzymes are purified.

11. A method of degrading hydrolyzed nerve agents GB, GD, GF, VX; Russian VX and/or R-VX comprising the steps of:

(a) treating said hydrolyzed nerve agent or agents with phosphonate ester hydrolase enzyme(s) derived from bacteria comprising *Burkholderis caryophili* PG2982; and (b) degrading said hydrolyzed nerve agents with said phosphonate ester hydrolase enzyme(s).

12. A method of biodegradation of nerve agents GB, GD, GF, VX, Russian VX and/or R-VX comprising the steps of:

(a) treating said nerve agent or agents with organophosphorus hydrolase and/or organophosphorus acid anhydrolase to form a hydrolyzed nerve agent or agents;

(b) treating said hydrolyzed nerve agent or agents with enzymes derived from bacteria, wherein said bacteria comprise Burkholderis caryophili PG2982 and utilize methylphosphonate (MPn), ethyl methylphosphonate (EMPn), isopropyl methylphosphonate (IMPn), and/or pinacolyl methylphosphonate (PMPn) as sole sources of phosphorus; and (c) degrading said hydrolyzed nerve agents with said enzymes derived from said bacteria.

* * * * *